United States Patent
Kandallu Suresh Bapu (10) Patent No.: US 9,930,182 B2
(45) Date of Patent: Mar. 27, 2018

(54) MEDIA SERVER INTERACTION IN CONFERENCING

(71) Applicant: Telekonnectors Limited, Chennai (IN)

(72) Inventor: Sreeram Kandallu Suresh Bapu, Chennai (IN)

(73) Assignee: Telekonnectors Limited (IN)

( * ) Notice: Subject to any disclaimer, the term of this patent is extended or adjusted under 35 U.S.C. 154(b) by 0 days.

(21) Appl. No.: 15/615,109

(22) Filed: Jun. 6, 2017

(65) Prior Publication Data

US 2017/0366673 A1 Dec. 21, 2017

Related U.S. Application Data

(60) Provisional application No. 62/382,604, filed on Sep. 1, 2016.

(51) Int. Cl.
*H04M 11/00* (2006.01)
*H04M 3/56* (2006.01)
*H04L 29/06* (2006.01)

(52) U.S. Cl.
CPC ...... *H04M 3/567* (2013.01); *H04L 29/06027* (2013.01); *H04L 65/1096* (2013.01); *H04L 65/608* (2013.01)

(58) Field of Classification Search
CPC ........ H04M 3/568; H04M 1/605; H04M 3/56; H04M 2203/352
USPC ........... 379/88.14, 93.1, 158, 202.01, 205.01
See application file for complete search history.

(56) References Cited

U.S. PATENT DOCUMENTS

| | | | | |
|---|---|---|---|---|
| 6,327,567 | B1 * | 12/2001 | Willehadson | H04M 3/56 704/231 |
| 9,621,853 | B1 * | 4/2017 | Yang | H04N 7/15 |
| 2002/0085697 | A1 * | 7/2002 | Simard | H04M 3/561 379/202.01 |
| 2003/0023672 | A1 * | 1/2003 | Vaysman | H04L 12/1827 709/203 |
| 2003/0083059 | A1 * | 5/2003 | Spitzer | H04M 3/24 455/423 |
| 2005/0207357 | A1 * | 9/2005 | Koga | H04L 12/1813 370/260 |
| 2013/0152153 | A1 * | 6/2013 | Weiser | H04L 63/0236 726/1 |
| 2014/0325395 | A1 * | 10/2014 | Itakura | H04M 3/56 715/753 |

(Continued)

*Primary Examiner* — Akelaw Teshale
(74) *Attorney, Agent, or Firm* — Donald R. Boys; Central Coast Patent Agency, LLC (57) ABSTRACT

A method for managing callers into a conference system having a specific conferee limit for servers has steps as follow: for a first caller over the limit for a first conference server, the first caller electing a first conference, establishing a first tie line to a second conference server, and placing the first caller in a continuation of the first conference in the second conference server, for a subsequent caller over the limit, electing to join the first conference, placing the subsequent caller in the continuation in the second conference server, and for a subsequent caller electing to join a conference other than the first conference, determining that there is a listener in the first conference, moving the listener to the continuation in the second conference server, and accommodating the subsequent caller in the first conference server in the conference elected, preserving the single tie line.

10 Claims, 7 Drawing Sheets

(56) References Cited

U.S. PATENT DOCUMENTS

| | | | |
|---|---|---|---|
| 2015/0055770 A1* | 2/2015 | Spittle | H04M 3/568 379/202.01 |
| 2015/0296086 A1* | 10/2015 | Eckert | H04M 3/568 381/17 |
| 2015/0326824 A1* | 11/2015 | Midtskogen Berger | H04L 12/1822 348/14.09 |
| 2017/0099457 A9* | 4/2017 | Charish | H04N 7/15 |

* cited by examiner

MEDIA SERVER INTERACTION IN CONFERENCING

CROSS-REFERENCE TO RELATED DOCUMENTS

The present application is related to Indian Provisional Application E-106/224/2016/CHE, which was filed on Jun. 15, 2016, and which is incorporated herein in its entirety. It is also related to U.S. Provisional Patent Application 62/382,604, which was filed on Sep. 1, 2016, which is also incorporated in its entirety at least by reference. This application claims priority to both the Indian and the US provisional applications.

BACKGROUND OF THE INVENTION

1. Field of the Invention

The present invention is in the technology area of telephone conferencing, and pertains more particularly to expanding conference capability with multiple media servers.

2. Description of Related Art

Media servers with software engines to conference multiple participants in one or more conferences are well-known in the art. The media server is a computer apparatus executing software that manages multiple audio feeds from and to persons participating with telephony-enabled devices in conferences. A media server is limited partly by hardware and partly by software to a maximum number of conferees, as it is the number of persons that determines the number of audio streams that must be managed and switched. When the limit of conferees is reached, it is common practice to tie in a second media server to handle the additional load. The second media server is coupled to the firsts media server by a tie line (a trunk line). If there is one additional conferee beyond the capacity of the first media server, there is need for one tie line. A second additional conference in current art requires a second tie line.

What is needed is a method of managing the conferences and media streams so additional tie lines are not needed as conferees are added beyond the ability of the first media server.

BRIEF SUMMARY OF THE INVENTION

In one embodiment of the invention a method for managing callers into a conference system having a specific conferee limit for servers is provided, comprising, for a first caller over the conferee limit for a first conference server, the first caller electing a first conference to join, establishing a first tie line to a second conference server, and placing the first caller in a continuation of the first conference in the second conference server, the tie line dedicated to the first conference, for a subsequent caller over the conferee limit for the first conference server, the subsequent caller electing to join the first conference, placing the subsequent caller in the continuation of the first conference in the second conference server, and for a subsequent caller electing to join a conference other than the first conference, determining that there is a listener in the first conference in the first conference server, moving the listener to the continuation of the first conference in the second conference server, and accommodating the subsequent caller in the first conference server in the conference elected, preserving the single tie line.

In one embodiment f the method further comprises, for a subsequent caller electing to join a conference other than the first conference, determining that there is no listener in the first conference in the first conference server, determining that there is a conferee in the first conference in the first conference server, moving the conferee to the continuation of the first conference in the second conference, and accommodating the subsequent caller in the first conference server in the conference elected, preserving the single tie line.

In one embodiment of the invention the method further comprises, for a subsequent caller electing to join a conference other than the first conference, determining that there is no listener in the first conference in the first conference server, and determining that there is a conferee in the first conference in the first conference server, moving the conferee to the continuation of the first conference in the second conference, and accommodating the subsequent caller in the first conference server in the conference elected, preserving the single tie line, and upon determining that all conferees in the first conference have been moved to the continuation of the first conference in the second conference server, dropping the tie line between the first and the second conference servers.

Also in an embodiment, for a subsequent caller electing to join a conference other than the first conference, after the first tie line is dropped, establishing a second tie line dedicated to the conference elected by the caller, and placing the caller in a continuation of the conference elected in the second conference server. And in one embodiment, continuing to manage incoming callers by the techniques of moving listeners, and moving conferees that are in a conference for which a tie line is dedicated, such that new conference servers are added as conferee limits are reached, with a single tie line bridging conference servers.

In another aspect of the invention a system managing callers in conferences is provided, comprising a first conference server having a plurality of established conferences, and a specific limit of number of conferees total that may be accommodated in all of the plurality of conferences, and a second conference server connected to the first conference server by a first tie line dedicated to a specific one of the plurality conferences. The first tie line is established in response to a first caller over the limit of conferees in the first conference server, is dedicated to the conference the first caller elects, and wherein a conference extension for the elected conference is established in the second conference server, with the first caller as a conferee, wherein for a subsequent caller electing the same conference as the first caller, the subsequent caller is placed in the conference extension in the second conference server for which the tie line is dedicated, and wherein, for a subsequent caller electing a conference other than the conference for which the tie line is dedicated, it is determined whether there is a listener in the first conference in the first conference server, and if so, the listener is moved to the conference extension in the second conference server, and the subsequent caller is accommodated in the elected conference in the first conference server.

In one embodiment of the system, for a subsequent caller electing to join a conference other than the first conference, determining that there is no listener in the first conference in the first conference server, determining that there is a conferee in the first conference in the first conference server, moving the conferee to the continuation of the first conference in the second conference, and accommodating the subsequent caller in the first conference server in the conference elected, preserving the single tie line.

Also in one embodiment, upon determining that all conferees in the first conference have been moved to the continuation of the first conference in the second conference server, dropping the tie line between the first and the second conference servers. In one embodiment, for a subsequent caller electing to join a conference other than the first conference, after the first tie line is dropped, establishing a second tie line dedicated to the conference elected by the caller, and placing the caller in a continuation of the conference elected in the second conference server. And in one embodiment the system further comprises continuing to manage incoming callers by the techniques of moving listeners, and moving conferees that are in a conference for which a tie line is dedicated, such that new conference servers are added as conferee limits are reached, with a single tie line bridging conference servers.

DETAILED DESCRIPTION OF THE INVENTION

Figure 1:
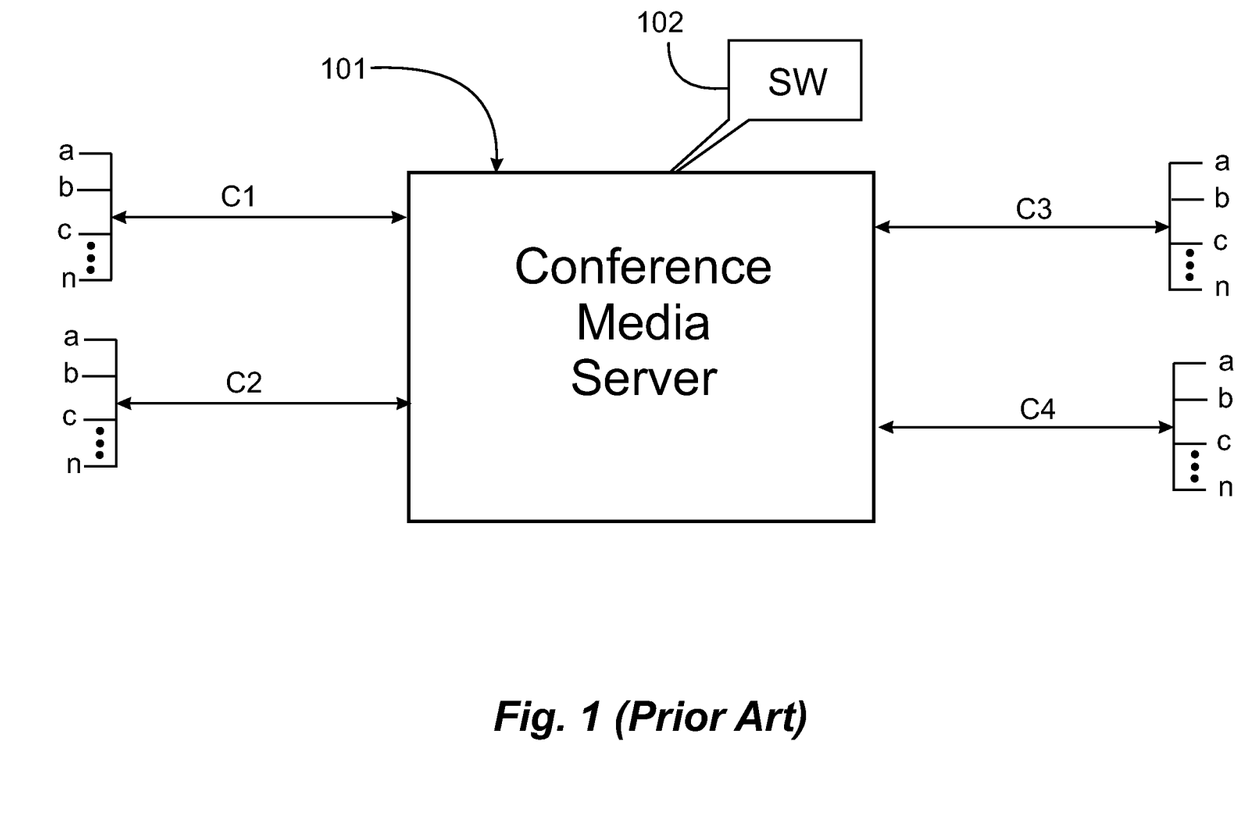
FIG. 1 is a diagram illustrating a single media server managing a number of conferences in current art.

FIG. 1 is a diagram illustrating a single media server 101, executing software 102, and managing four conferences C1 through C4, each conference having a number of conferees, a through n, in current art.

Figure 2:
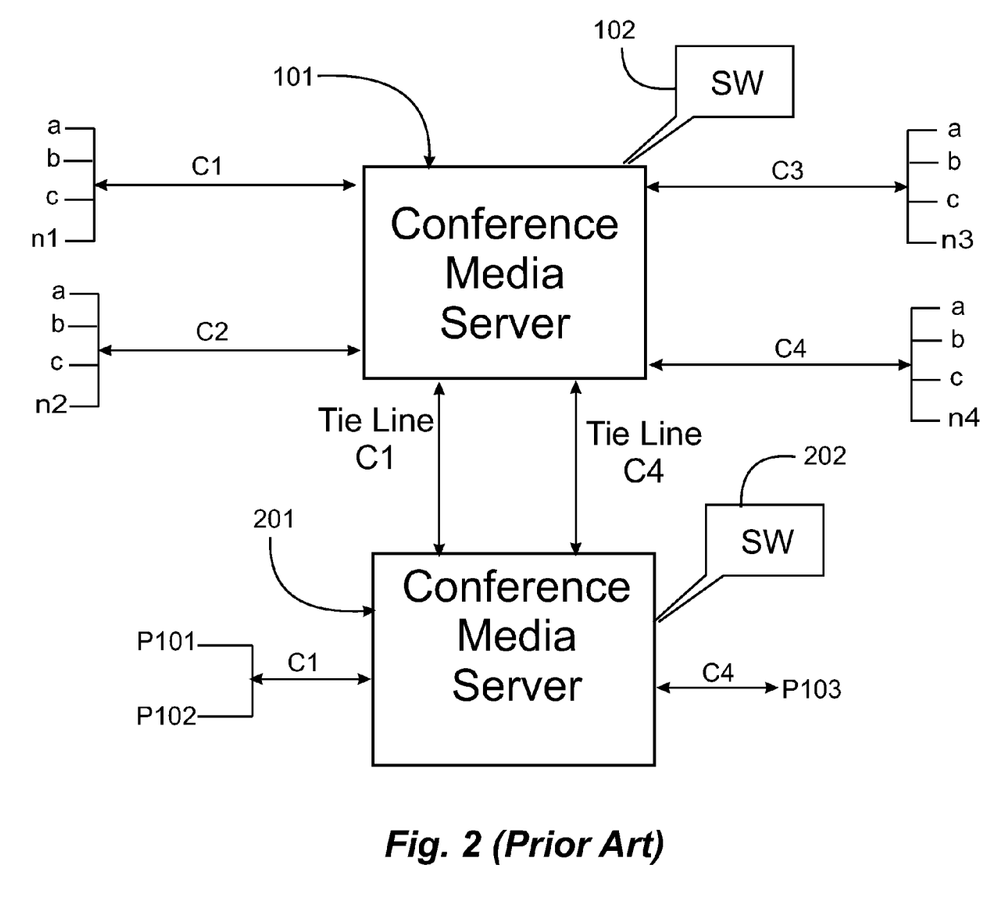
FIG. 2 is a diagram illustrating a second media server coupled to a first media server in current art.

FIG. 2 illustrates a circumstance wherein media server 101 has reached its limit of conferees, and a second media server 201 has been utilized to manage an excess of conferees. In FIG. 2 there are four conferences shown as being managed by Media Server 101, with n1 conferees in conference 1 (C1), n2 in conference C2, n3 in conference C3, and n4 in conference C4. As described above, media server 101 is limited by a maximum number of conferees, not necessarily by the number of conferences.

As an example, Media Server 101 might be limited to 100 conferees. If n1+n2+n3+n4 is equal to or less than 100, Media Server 101 is adequate to the tasks, and no second media server is needed. If additional conferees join the conferences in progress until there are a total of 100, the next person who joins one of the conferences, indicated as P101 in FIG. 2, will have to be accommodated in Media Server 201 for managing the audio streams. Assume that P101 joins conference C1, and that puts Media Server 101 over its limit. To accomplish this enlargement of service to Media Server 201 a Tie Line T1 is necessary to bridge conference C1 between Media Server 101 and Media Server 201. If yet another person P102 joins conference C1 that person also will be allocated to Media Server 201, but the first Tie Line for C1 will be adequate.

Also indicated in FIG. 2 is a circumstance wherein a third person, P103, has joined conference C4 in Media Server 101. This third person over the limit must also be allocated for media service to Media Server 201, and in the current art a second Tie Line T4 is now necessary, to join all of the conferees in C4. The skilled person will recognize that there may be more than four conferences being originally managed in Media Server 101, and that a separate Tie Line will need to be established for every conference that is bridged between Media Servers.

Figure 3:
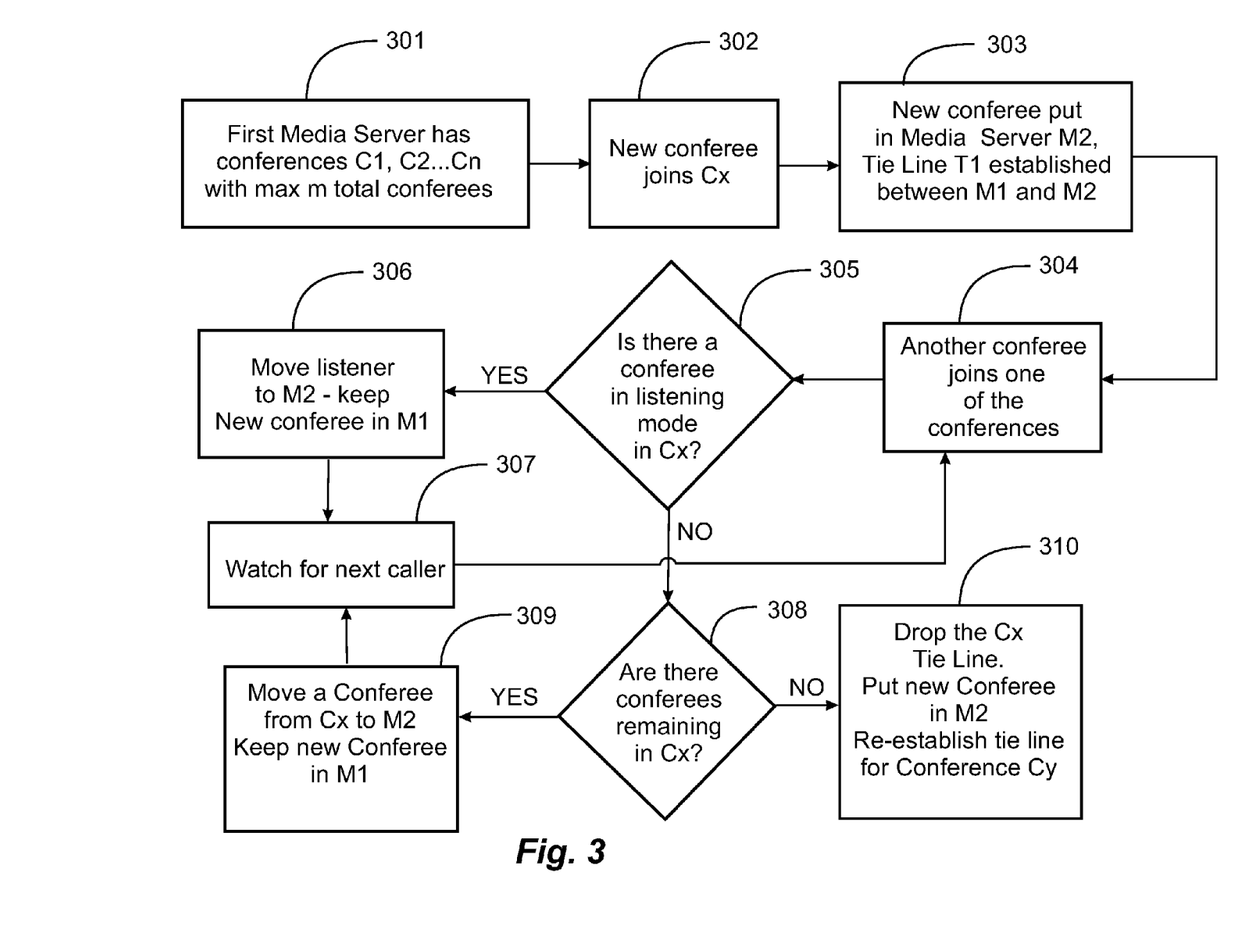
FIG. 3 is a flow chart illustrating a method in an embodiment of the invention.

FIG. 3 is a flow chart illustrating a method in an embodiment of the invention for minimizing the number of media servers and tie lines in expanded service. FIGS. 4A through 4D are schematic diagrams illustrating state of a system of the invention at different stages in the process illustrated by FIG. 3.

Figure 4A:
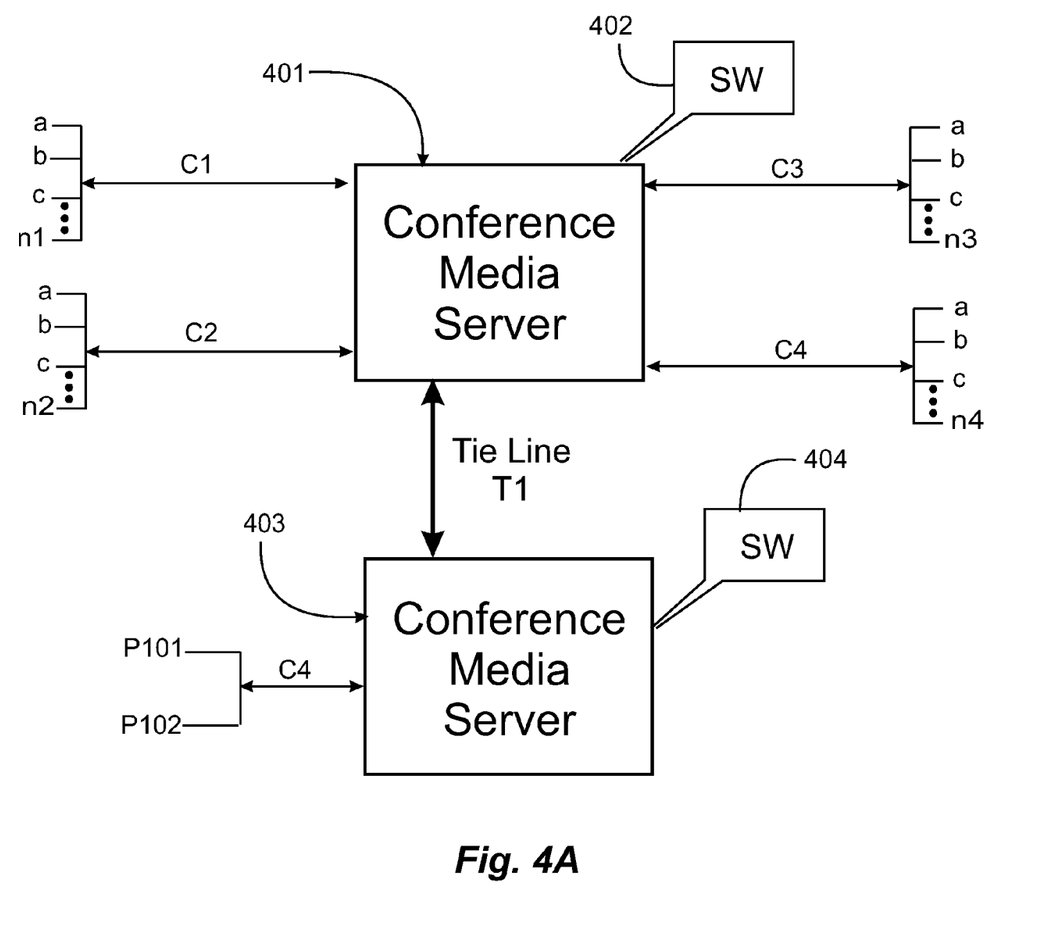
FIG. 4A is a diagram of servers according to an embodiment of the invention.

Referring now to FIG. 3, process flow is arbitrarily commenced at step 301, under a circumstance that a first Media Server, noted as M1 in FIG. 3, has a plurality of conferences in progress, noted as C1 through Cn, and under a circumstance that the number of conferees total in all of conferences C1 through Cn, in progress, is exactly at the limit, example 100, for the capability of the first Media Server. This circumstance is illustrated by server 401 in FIG. 4, with ongoing conferences C1, C2, C3 and C4.

At step 302 a new conferee calls in to join one of the conferences. This new caller is one more than Media Server 401 can serve, designated P101, so will have to be accommodated in a second media server 403. Let us assume, for illustration, that the new caller is calling for conference C4 in Media Server 401. Consequently, a tie line T1 is established to Media Server 403 (M2), and caller P101 is accommodated in an extension of C4 in M2, as illustrated in FIG. 4A.

In the technical field of conference bridges, servers and software for managing conferencing, a relatively large number of conferees may be engaged in conferences at any one time. It is common practice to manage conferees in different modes, one of which is a full-service mode, such that a conferee in full service mode may hear all other conferees in a particular conference, and may speak to all of the other conferees. Another mode which may be practiced is Listening mode, in which a conferee may hear one or more other conferees, or all other conferees in a conference, but cannot participate by speaking.

Now, at step 304 another caller, designated P102, dials in to join one of the conferences in Media Server 401. This next caller may be asking to join the same conference C4 as the first new caller, but it may well be a different one of the conferences in progress. If the second new caller wants to join the same conference as the first new caller, then that caller may be accommodated in M2, Media Server 403, along with the first new caller, without adding a second tie line. This circumstance is also shown in FIG. 4A with both P101 and P102 together in an extension of whatever conference they both elected to join. There is, at this point, no need for a further tie line.

Figure 4B:
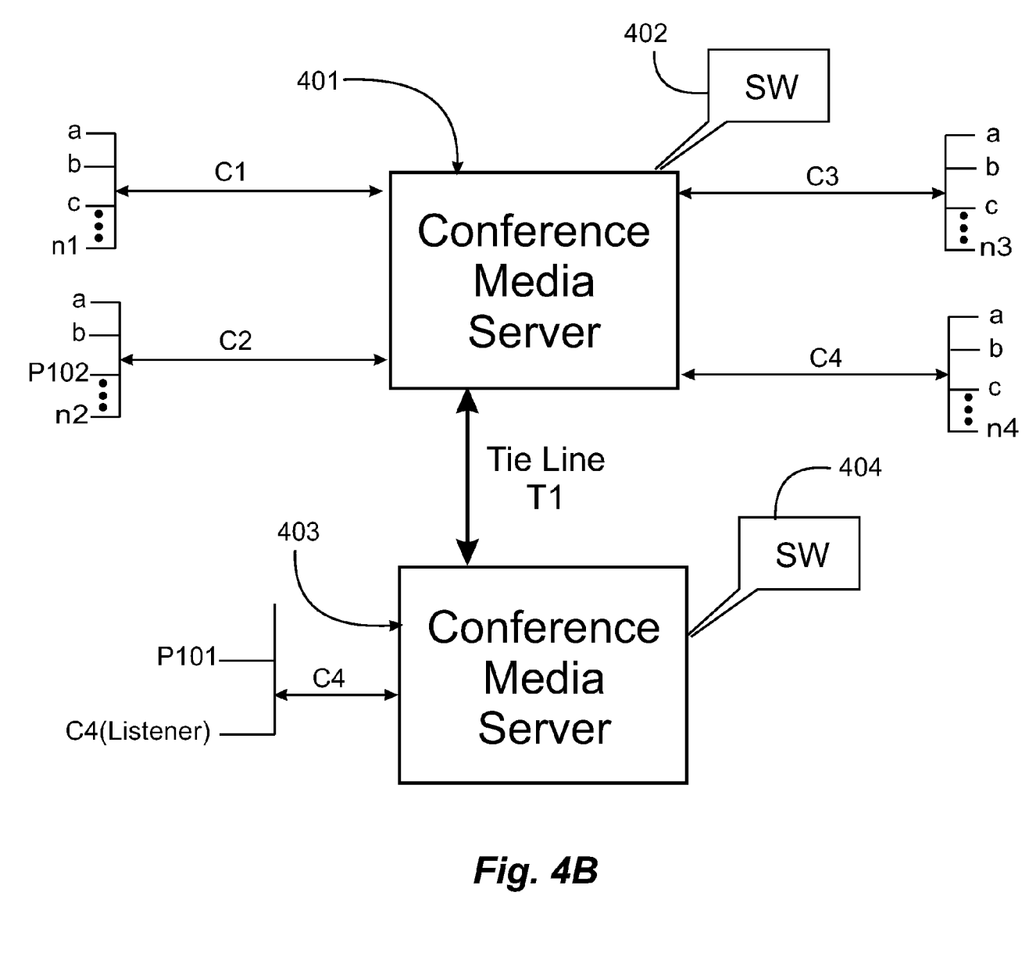
FIG. 4B is another diagram illustrating a state in the method of the invention.

Now let us assume the second new caller, P102, wants to join a different conference in progress in Media server 401 than the conference elected by the first new caller P101, assume C2. In an embodiment of the invention, instead of accommodating this additional new caller P102 in Media Server 403, and establishing a second tie line for conference C2, which would then be bridged between the two media servers, in this embodiment control goes to step 305, and it is determined whether there is a conferee in listening mode (listener) in conference C4, the conference for which a tie line has been established to M2, Media server 403. If there is a listener in conference C4, that listener is moved to the C4 extension in second Media Server 403 (M2), as noted in step 306. This frees up one position in the first media server for the new caller in conference C2 in Media Server 401, so there is no need to put the new caller in the second Media Server or to add a Tie Line for C2. This circumstance is shown in FIG. 4B, where C4 (Listener) is now in the C4 conference extension in Server 403, and the second new caller P102 is connected in C2 in Server 401. We have had two new callers, the second new caller in two different circumstances, and we still have but one tie line.

In the circumstance wherein a listener is moved from C4 to Server 403, the system in step 307 listens for a next caller, back to step 304. This next caller is designated P103, wants to join one of the conferences in first Media Server 401, and that conference elected is not C4, but for another conference, say C3. At the same time, SW 402 continues to monitor total conferees in Media Server 401. If one or more drop out, then spaces are freed.

Figure 4C:
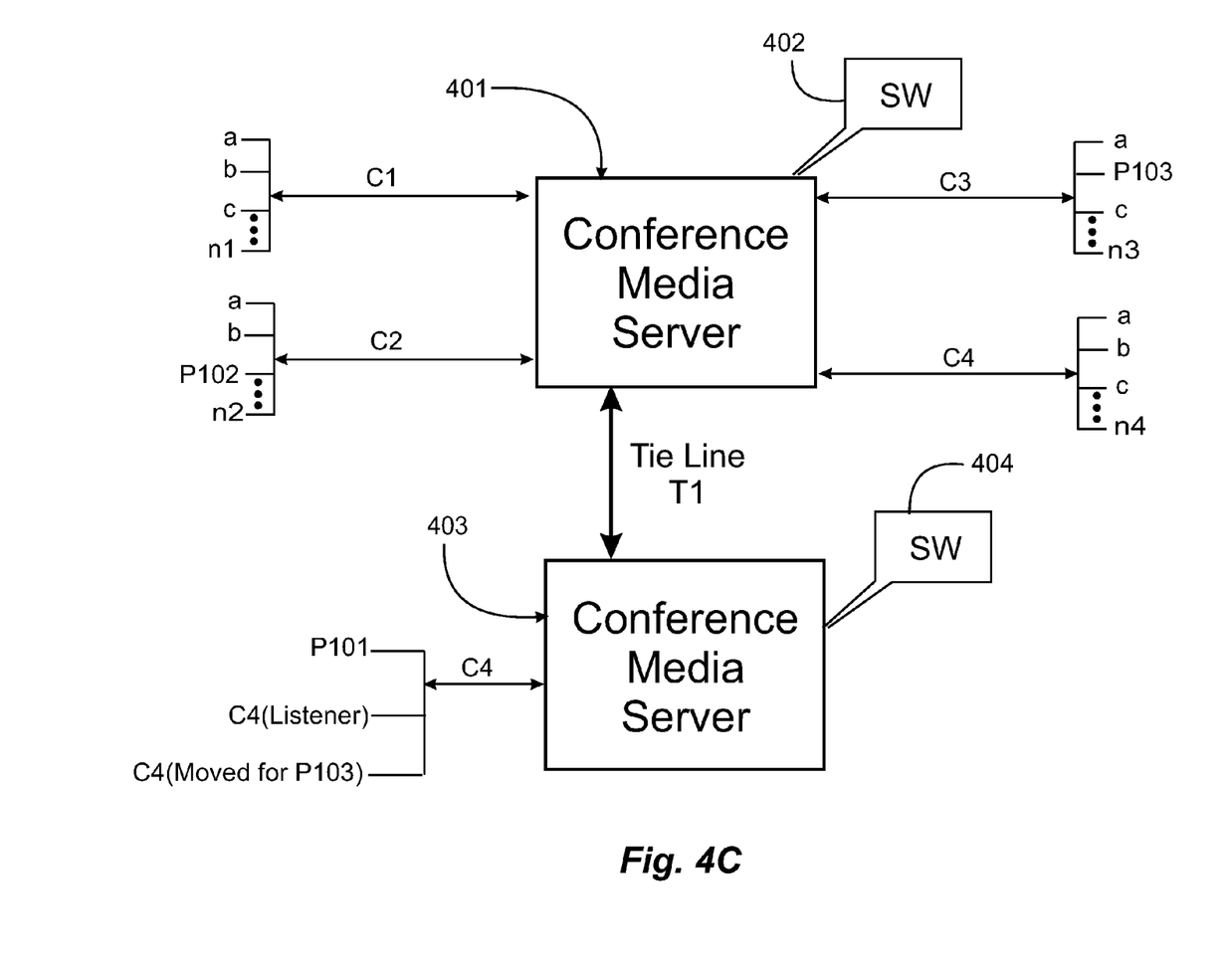
FIG. 4C is a diagram illustrating a further state in an embodiment of the invention.

Considering new caller P103, if at step 305 there is no further listener found in the conference C4 for which the first Tie Line has been established (NO), in step 308, the system checks if there are conferees left in that conference, that is, is the conference still in progress with two or more conferees? If yes, then a conferee in the conference for which the Tie line has been established (our example assumes C4) is moved to the second media server at step 309. In FIG. 4C this moved conferee is designated C4 (Moved). The control goes back to step 307 looking for a next caller. At this point, there have been three new callers, over and above the 100-conferee limit for Server 401, and there is still need for just the one tie line to Server 403. This process may continue, under fortuitous circumstances through a substantial number of new callers while avoiding a need for a second tie line, in embodiments of the invention.

Figure 4D:
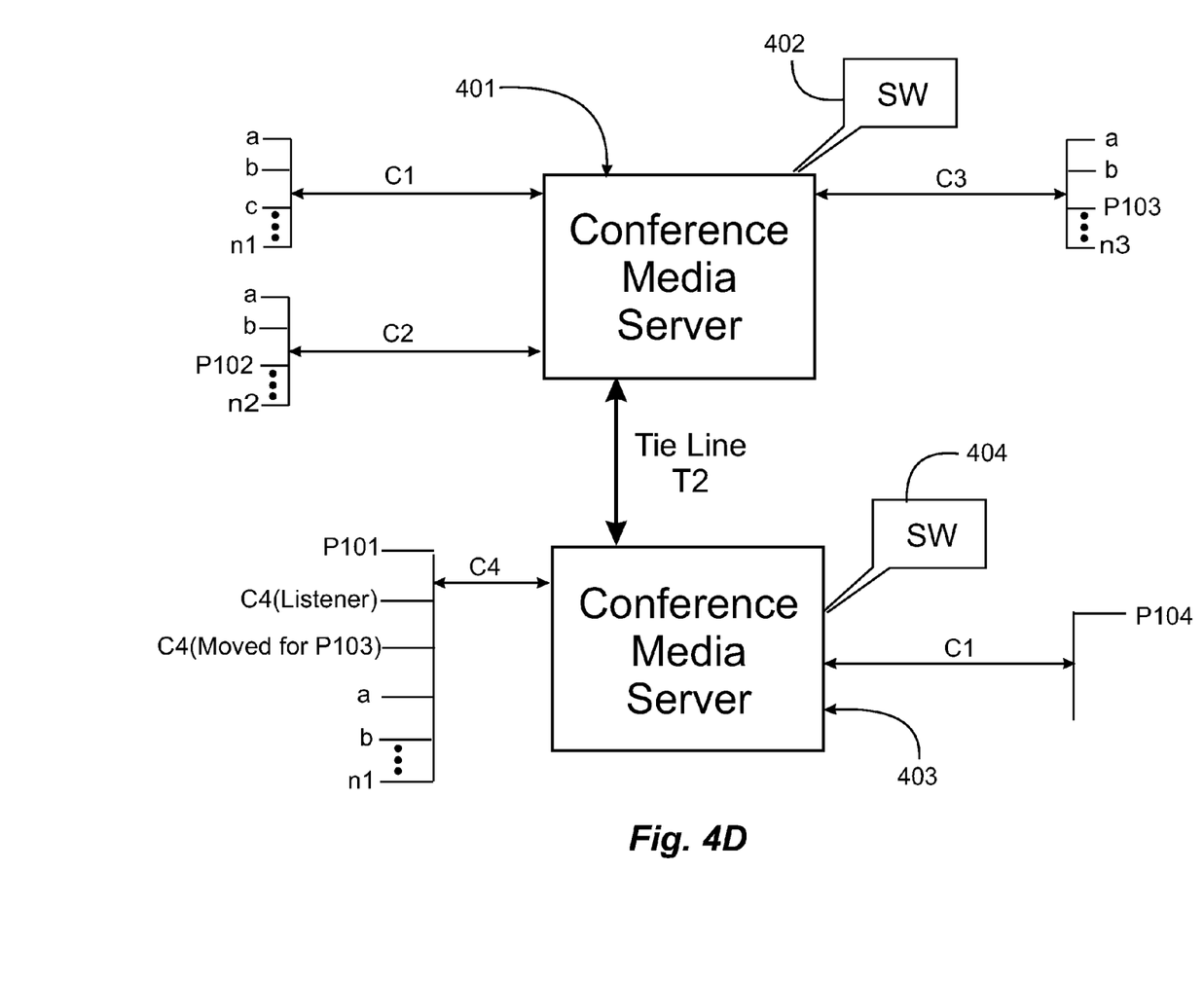
FIG. 4D is a diagram illustrating a further state in an embodiment of the invention.

Consider now a new caller P104, wanting to join a conference, say C1. Consider that in this circumstance there a no listeners in C4 to move to Server 403, and at step 308 there are no conferees left in C4. In previous additions of new callers, all conferees of C4 have been moved to Server 403, to accommodate new callers, over the threshold of 100 callers, to accommodate the new callers in Server 401. If, at step 308, If there are no conferees left in C4 in the first media server, control goes to step 310, and the Tie Line between the first and the second media servers may be dropped, as C4 is now managed completely in the second media server. New caller 104, having elected to join conference C1, is then accommodated in a continuation of C1 in Server 403, and a new tie line T2 is established for the continuation of C1. This circumstance is illustrated by FIG. 4D. The process, of course continues, and additional callers over the Server 401 threshold of 100, will be accommodated as described above, by moving listeners and conferees out of C1, into Server 403, and only one tie line is still necessary between Servers 401 and 403.

The skilled person will understand, given the examples described, that there are many variable circumstances, and that the process may proceed according to the flow chart of FIG. 3 in a number of different ways, but that there will never be a need for more than one tie line between the original server and a second server tied in to take the progressive overload of the first server. In the second server, SW 404, like SW 402, enforces the operating parameters described, and a third and successive servers may be tied in, but that there will never be a need for more than a single tie line between servers.

The skilled person will realize that these novel steps may be followed to ensure that no more than one tie line need be established between any two Media Servers. The skilled person will also realize that the steps may be done perhaps in another order, and that there are alternative ways to accomplish the novel process without departing from the scope of the invention. The invention is limited only by the claims below.

The invention claimed is:

1. A method for managing callers into a conference system having a specific conferee limit for servers, comprising:
for a first caller over the conferee limit for a first conference server, the first caller electing a first conference to join, establishing a first tie line to a second conference server, and placing the first caller in a continuation of the first conference in the second conference server, the tie line dedicated to the first conference;
for a subsequent caller over the conferee limit for the first conference server, the subsequent caller electing to join the first conference, placing the subsequent caller in the continuation of the first conference in the second conference server; and
for a subsequent caller electing to join a conference other than the first conference, determining that there is a listener in the first conference in the first conference server, moving the listener to the continuation of the first conference in the second conference server, and accommodating the subsequent caller in the first conference server in the conference elected, preserving the single tie line.

2. The method of claim 1 further comprising:
for a subsequent caller electing to join a conference other than the first conference, determining that there is no listener in the first conference in the first conference server, determining that there is a conferee in the first conference in the first conference server, moving the conferee to the continuation of the first conference in the second conference, and accommodating the subsequent caller in the first conference server in the conference elected, preserving the single tie line.

3. The method of claim 2, further comprising:
upon determining that all conferees in the first conference have been moved to the continuation of the first conference in the second conference server, dropping the tie line between the first and the second conference servers.

4. The method of claim 3 further comprising;
for a subsequent caller electing to join a conference other than the first conference, after the first tie line is dropped, establishing a second tie line dedicated to the conference elected by the caller, and placing the caller in a continuation of the conference elected in the second conference server.

5. The method of claim 4, further comprising:
continuing to manage incoming callers by the techniques of moving listeners, and moving conferees that are in a conference for which a tie line is dedicated, such that new conference servers are added as conferee limits are reached, with a single tie line bridging conference servers.

6. A system managing callers in conferences, comprising:
a first conference server having a plurality of established conferences, and a specific limit of number of conferees total that may be accommodated in all of the plurality of conferences;
a second conference server connected to the first conference server by a first tie line dedicated to a specific one of the plurality conferences;
wherein the first tie line is established in response to a first caller over the limit of conferees in the first conference server, is dedicated to the conference the first caller elects, and wherein a conference extension for the elected conference is established in the second conference server, with the first caller as a conferee, wherein for a subsequent caller electing the same conference as the first caller, the subsequent caller is placed in the conference extension in the second conference server for which the tie line is dedicated, and wherein, for a subsequent caller electing a conference other than the conference for which the tie line is dedicated, it is determined whether there is a listener in the first conference in the first conference server, and if so, the listener is moved to the conference extension in the second conference server, and the subsequent caller is accommodated in the elected conference in the first conference server.

7. The system of claim 6 wherein, for a subsequent caller electing to join a conference other than the first conference, determining that there is no listener in the first conference in the first conference server, determining that there is a conferee in the first conference in the first conference server, moving the conferee to the continuation of the first conference in the second conference, and accommodating the subsequent caller in the first conference server in the conference elected, preserving the single tie line.

8. The system of claim 7, wherein, upon determining that all conferees in the first conference have been moved to the continuation of the first conference in the second conference server, dropping the tie line between the first and the second conference servers.

9. The system of claim 8 wherein, for a subsequent caller electing to join a conference other than the first conference, after the first tie line is dropped, establishing a second tie line dedicated to the conference elected by the caller, and placing the caller in a continuation of the conference elected in the second conference server.

10. The system of claim 9, further comprising continuing to manage incoming callers by the techniques of moving listeners, and moving conferees that are in a conference for which a tie line is dedicated, such that new conference servers are added as conferee limits are reached, with a single tie line bridging conference servers.

* * * * *